(12) United States Patent
Lausen

(10) Patent No.: US 7,929,400 B2
(45) Date of Patent: Apr. 19, 2011

(54) OPTICAL SOUND TRACK SCANNER SYSTEM

(75) Inventor: Henrik Lausen, København N (DK)

(73) Assignee: Laser Interface Photonics I/S, Copenhagen (DK)

( * ) Notice: Subject to any disclaimer, the term of this patent is extended or adjusted under 35 U.S.C. 154(b) by 941 days.

(21) Appl. No.: 11/631,029

(22) PCT Filed: Jun. 28, 2005

(86) PCT No.: PCT/DK2005/000441
§ 371 (c)(1),
(2), (4) Date: May 4, 2007

(87) PCT Pub. No.: WO2006/000231
PCT Pub. Date: Jan. 5, 2006

(65) Prior Publication Data
US 2008/0212451 A1 Sep. 4, 2008

Related U.S. Application Data

(60) Provisional application No. 60/521,769, filed on Jul. 1, 2004.

(30) Foreign Application Priority Data

Jun. 29, 2004 (DK) .................................. 2004 01024

(51) Int. Cl.
*G11B 7/00* (2006.01)
(52) U.S. Cl. .................................. 369/112.23; 369/119

(58) Field of Classification Search .......................... None
See application file for complete search history.

(56) References Cited

U.S. PATENT DOCUMENTS

| 3,768,907 | A | * | 10/1973 | Williams | ........................ 356/71 |
| 3,949,191 | A | * | 4/1976 | Crowther et al. | ............. 235/380 |
| 4,085,296 | A | | 4/1978 | Keegan | |
| 4,223,188 | A | | 9/1980 | Dolby | |
| 4,338,684 | A | | 7/1982 | Dolby | |
| 4,596,008 | A | | 6/1986 | Beard | |
| 5,002,348 | A | | 3/1991 | Wolf | |
| 5,237,559 | A | | 8/1993 | Murphy et al. | |
| 5,339,305 | A | * | 8/1994 | Curtis et al. | ................... 369/103 |
| 5,436,867 | A | * | 7/1995 | Mok | ............................ 365/216 |

(Continued)

FOREIGN PATENT DOCUMENTS

WO WO 03-025910 3/2003

OTHER PUBLICATIONS

Wiles, S., et al., "Digital Optical Sound on 35 mm Motion-Picutre Film".

*Primary Examiner* — Paul Huber
(74) *Attorney, Agent, or Firm* — Lee & Morse, P.C.

(57) ABSTRACT

The present invention relates to an optical scanner system for scanning of an optical sound track with a beam of light, comprising a light emitter for emission of a light beam, a device for scanning the light beam across an optical sound track, the light beam forming a scanning spot on the optical sound track, an optical detector for detection of the light beam upon interaction of the light beam with the optical sound track and generating an electronic signal representing the sound recorded in the optical sound track.

23 Claims, 8 Drawing Sheets

U.S. PATENT DOCUMENTS

| | | |
|---|---|---|
| 5,526,075 A | 6/1996 | Carlsen, II |
| 5,543,868 A | 8/1996 | Tachi |
| 5,587,749 A | 12/1996 | Goldberg et al. |
| 5,631,887 A * | 5/1997 | Hurst, Jr. .................. 369/47.53 |
| 5,740,294 A | 4/1998 | Baumann et al. |
| 6,351,302 B1 | 2/2002 | Carlsen, II et al. |
| 7,248,293 B2 * | 7/2007 | Iwasawa .................. 348/240.3 |
| 2004/0184003 A1 | 9/2004 | Valenzuela et al. |

* cited by examiner

○ = moving spot 116  114

A    B

OPTICAL SOUND TRACK SCANNER SYSTEM

CROSS REFERENCE TO RELATED APPLICATIONS

This is the U.S. national phase application based on PCT application No. DK2005/000441 filed Jun. 28, 2005, which is based on Danish Application PA 2004 01024, filed Jun. 29, 2004, and U.S. Provisional Application Ser. No. 60/521,769, filed Jul. 1, 2004, the entire contents of all of which is hereby incorporated by reference.

FIELD OF THE INVENTION

The present invention relates to an improved optical scanner system for scanning of an optical sound track with a beam of light.

BACKGROUND OF THE INVENTION

Optical sound recording was invented in the beginning of the 20'th century. The sound is recorded by optical means on the film together with the pictures forming the movie. The recorded optical sound track consists of one or two narrow tracks extending along one of the sides of the film next to the sequence of picture frames. The optical sound track may be either intensity or width modulated, the modulation forming an analogue representation of the recorded sound signal. While different standards were used in the beginning of optical sound recording, the prevailing standard is width modulation or variable area tracks, in particular double tracks each with double-sided modulation, providing the best quality and enabling stereo.

A detailed description of optical sound principles, data and standards can be found in the literature, e.g. ISO 2939-1975 (E).

The typical film data and optical design parameters for an optical sound track are shown in Table 1 below:

TABLE 1

| | |
|---|---|
| Total scan area | >2.1 mm |
| Each track width | 0.93-1.03 mm (double track, stereo) |
| Track separation: | 0.1 mm |
| Typical sound frequencies: | 20-10.000 Hz |
| Typical Film speed: | 0.5 meters/second |
| Typical film grain size: | 3-4 µm |

Conventionally, optical sound tracks are recorded using a system with galvanometric blade shutters modulated by the sound and illuminated and imaged onto the film. Modern versions include laser illuminated shutter systems and laser scanning recording systems. Regardless of the technique employed, the bandwidth of optical sound has traditionally been limited to 9-10 kHz particularly when mechanical shutters are used. Modern recording systems can go somewhat higher, perhaps up to 12-15 kHz, though no new standard has been set. On the negative film, the sound track is recorded as black on transparent background.

Originally the advantage of optical sound was the simplicity of the playback. The film is illuminated through a narrow slit so that the common area of the slit and the transparent parts of the sound track determines the amount of light transmitted through the film. A photocell behind the film transforms this modulated light into an electrical signal, which is an analogue electronic representation of the recorded sound signal. The sound may be recorded and played back using noise reduction systems and compression of various types, but this does not change the basic characteristics of the physical sound track, only its dynamics. Thus, optical sound tracks enable utilization of simple, low-cost playback heads on projectors and other equipment.

U.S. Pat. Nos. 4,223,188 and 4,338,684 disclose electronic scanning of the sound track by the detector to obtain width-modulated pulses, which are subsequently demodulated and post-processed in digital-logical circuits.

U.S. Pat. No. 6,351,302 B1 discloses an elaborate digital post-processing system relying on a pulse-width modulated signal by electronic scanning using a CCD array, which is illuminated from the front side.

The simplicity of optical sound is not obtained without noise and distortion. A primary source of noise is dust, dirt, debris and scratches on the film. As a result more noise is generated as the open or transparent areas of the sound track increase. This problem is particularly severe for optical sound track negatives. On negatives, the transparent area on the sound track is largest when the sound signal level is low, and since low-level signals are not nearly as effective as high-level signals in masking noise, the resulting signal-to-noise level may be unacceptable. In particular old movies, which were recorded without modern noise-reduction systems, suffer from this. Re-issuing older films for cinema and transfer to electronic media, CD, DVD and Video put new demands on reproduction of optical sound tracks.

SUMMARY OF INVENTION

Thus, there is a need for an apparatus facilitating reproduction of a recorded optical sound track with an improved signal-to-noise ratio.

Further, there is a need for an apparatus facilitating reproduction of an optical sound track from a negative.

According to a first aspect of the invention, an optical sound track scanner system is provided comprising a light emitter for emission of a light beam, a device for scanning the light beam across an optical sound track, the light beam forming a scanning spot on the optical sound track, and an optical detector for detection of the light beam upon interaction of the light beam with the optical sound track whereby detection of sound modulation recorded in the sound track is facilitated.

The light emitter for emission of a light beam may be a laser, e.g. a semiconductor laser, a gas laser, such as a helium-neon laser, etc., a diode-pumped solid state laser, etc, for reliable and inexpensive emission of a well defined light beam of a high intensity.

The light emitter may comprise optics for collimation of the light beam.

The wavelength of the emitted light beam may range from visual to near infrared, e.g. from 380 nm-1100 nm.

The device for scanning may comprise a movable mirror for deflection of the light beam. The mirror may be moved by a mirror actuator, such as a galvanometer, a piezoelectric element, etc. Alternatively, the mirror may form a polygon that is rotated by a motor drive. Preferably, the polygon scanner has a large number of plane surfaces, e.g. 32-48, and a high rotating speed. The light beam may impede on the polygon scanner more than once. This is further explained below.

In another embodiment, the device for scanning comprises a crystal for deflection of the light beam. For example in an acousto-optic scanner, a piezo-electric actuator is positioned for generation of a pressure wave, such as an ultrasonic sound wave, propagating through the crystal in a direction substantially perpendicular to the propagating direction of the light beam. The pressure wave generates variations in the refractive index and thereby forms a diffraction grating in the crystal that deflects the light beam. The wavelength of the pressure wave determines the grating constant of the diffraction grating and thereby the deflection angle of the deflected light beam.

Alternatively, electro-optic scanners rely on refractive index changes induced by high voltages. The resulting deflection angles are small.

The optical detector may be made of silicon, which is favourable for visual wavelengths or InGaAs, which is favourable for low intensity levels and red to NIR wavelengths. The size of the detector area may be in the range from 25 µm$^2$ to 10 mm$^2$, preferably 0.1 mm$^2$-10 mm$^2$.

The optical detector may comprise a plurality of detector elements, such as an array of detector elements. A plurality of detector elements may provide enhanced information about the light beam received after interaction with the optical sound track. Employment of a plurality of detector elements enables the system to distinguish between transmitted and diffracted light, since one detector element may measure the transmitted light, and one or more detector elements may measure different parts of the diffracted light.

The plurality of detector elements may comprise a substantially circular detector element surrounded by an annular detector element. Another configuration of detector elements is a line array along the scanning direction, the line array comprising for example 2, 3, 4, 5, 6, 7 or more detector elements. An array, such as for example a 3 by 3, 4 by 4, 5 by 5, 9 by 9,128 by 128, or 256 by 256 array, of detector elements may also be employed. A plurality of detector elements may provide a more precise definition of an edge in the soundtrack, and an array of detector elements may further provide detection of the direction of the edge for enhanced high frequency analysis. The size of a detector element area may be in the range from 25 µm$^2$ to 10 mm$^2$, preferably 0.1 mm$^2$ to 10 mm$^2$.

Furthermore, the optical sound track scanner system may comprise pre-scan optics for adaption of the light beam to the device for scanning.

Additionally the optical sound track scanner system may comprise post-scan optics for adaption of the output light beam from the device for scanning to form a scanning spot on the optical sound track.

The scanning spot may have an arbitrary shape, such as a circular shape, a rectangular shape, an elliptic shape, etc.

The area of the scanning spot may be in the range 10 µm$^2$-1,000 µm$^2$, preferably 150 µm$^2$-500 µm$^2$. In an embodiment, the scanning spot is substantially circular having a diameter of 4-35 µm, since a scanning spot smaller than 4 microns will produce more irregularity than accuracy and a spot larger than 35 microns will not resolve high frequencies. A scanning spot in the range of 4-35 µm on each of the axes X and Y with any X-Y size combination may be employed. A range of 15-25 µm on each axis is preferred showing experimentally good results. The scanning spot may be formed in any suitable circular or noncircular shape by the pre-scan or the post-scan optics alone or in combination.

Furthermore the optical sound track scanner system may comprise Fourier optics that is positioned between the optical sound track and the detector in such a way that the detector resides in the Fourier plane of the optical sound track.

The Fourier optics may be a refractive lens, a diffractive lens, or other suitable lenses, such as single or multi-element lenses, such as an achromatic doublet. Preferably, the optical sound track is positioned in the front focal plane of the Fourier lens, and the detector is positioned in the back focal plane of the Fourier lens.

The post-scan optics may generally focus the light beam on the optical sound track so that the optical sound track resides at the beam waist of the light beam. The optical sound track edges cause the light beam to diverge during transmission of the light beam through the optical sound track. The Fourier lens directs the light beam towards the detector for formation of a light spot on the detector in such a way that the position of the spot on the detector is independent of the position of the scanning spot on the optical sound track. This provides for true space-to-time transformation since light from any scanning position illuminates the entire detector area making detector surface irregularities insignificant.

Further, detection of sound track edges is improved. Adding Fourier optics improve the edge detection allowing scanning with a larger spot, since the edge will move light towards higher spatial frequencies in the Fourier plane, i.e. light is moved away from the centre of the light detector whereby a sharp transition in detected light intensity is generated by an edge. Additionally, small scratches, particles and irregularities do not cause significant diffraction since the spot surrounds them.

Preferably, the light beam propagates in a direction substantially perpendicular to the sound track when the light beam is detected after transmission through the optical sound track.

Alternatively, the light beam may be reflected on the sound track.

The device for scanning may scan the optical sound track with a scanning frequency in the range of 20-300 kHz, e.g. 32 kHz, 44.1 kHz, 48 kHz, 96 kHz, 192 kHz, preferably 96 kHz. Higher scanning frequencies are contemplated.

Furthermore the optical scanner system may comprise means, e.g. in the pre-scan and/or post-scan optics, to compensate for lensing.

The optical sound track may be recorded on a negative or on a positive. The optical sound track may comprise single or dual tracks that are unilateral and/or bilateral. The soundtrack may be in mono, in stereo or in any other suitable coding, such as for example Dolby SR or Dolby SR-D.

The optical scanner system may further comprise an electrical circuit with a comparator circuit, the electrical circuit being adapted to transform an output signal from the optical detector into a pulse-width modulated signal suitable for conversion into sound. The comparator circuit may have at least one adjustable threshold level.

The electrical circuit may further comprise a digital circuit for digital processing of the detector output signal.

The output signal from the detector may comprise one or more detector element output signals. For example, if the detector has two detector elements the output signal may comprise two detector element signals.

One or more audio sound channels, such as for example two or four channels, may be extracted from a detector element output signal. In case of a dual track, e.g. in mono or stereo, two channels A and B may be extracted from a detector element output signal, e.g. by appropriate gating of the output signal. The electrical circuit may be adapted to perform this.

Channel characteristics of the respective channel or channels derived from a detector element output signal, such as channel position, width and trigger level, may be adjusted, e.g. during use, by a user of the scanner system.

The electrical circuit may comprise delay elements to enable comparison of two channels. Furthermore, the electrical circuit may comprise pulse logic to perform noise reduction in for example dual tracks in mono. The pulse logic may comprise one or more logic functions, such as for example AND, OR, XOR alone or in combination. The pulse logic may be controlled and adjusted by the user of the scanner system, e.g. during operation.

The pulse logic may operate on one or more detector element output signals or on channel signals derived from detector element output signals to provide a pulse-width modulated signal suitable for conversion into sound.

It is an important advantage of the system according to the present invention that it can be used for reproduction of optical sound tracks from a negative providing a reproduced signal with a good signal-to-noise ratio.

A further problem with playback of a negative film is related to the so-called image spread as further explained below. Image spread distortion is a well-known problem caused by an unintended expansion of the soundtrack of a film during exposure.

A further object of the invention is to introduce the concept of a Virtual Edge Position, VEP, which the user can define without the use of imaging analysis or image algorithms. The VEP is used to counteract image spread distortion, which is particularly inherent in film negatives. During film exposure internal light scattering and back reflection cause the soundtrack to be exposed over its intended boundaries, somewhat like ink on soft paper. Image spread distortion thus leads to a misshaped soundtrack, which particularly affects the high frequencies. For low frequencies the width of the soundtrack has grown, but the consequence for the waveform is not significant. For high frequencies the waveform is significantly distorted. The "valleys" are not as deep as they should be and the edges, which should be sharp are rounded. The resulting sound is an unpleasant sibilance with low frequency components somewhat like old microphones.

When film negatives are used for positive prints, and the settings are right, image spread will cancel itself in the positive, since a similar growth occur in the opposite direction. To test if the exposure is right a cross-modulation track may be employed. In the cross-modulation track a high and a low frequency, typically 10 KHz and 400 Hz is intermodulated, so that the low frequency sound when played will phase out, provided the light-to-dark area distribution is correct. If the cross-modulation track is not correct another exposure must be selected. This of course is time consuming and expensive. Thus there is an interest in obtaining the sound directly from the negative if an electronic or digital copy such as video, CD or DVD is the goal. Image spread is an obstacle to do this.

It is an object of the invention to compensate for image spread in a manner, which can be adjusted by the user over a wide variety of film types. In other words there is a need for a user to be able to define and/or adjust the VEP in an optical soundtrack.

It should be noted that the invention is essentially a non-imaging system. As opposed to prior art soundtrack scanners that rely on imaging the soundtrack in one way or another, the system according to the present invention does not image the soundtrack edges. Instead the system according to the present invention detects what happens with the energy distribution of the light beam when the light beam passes or hits the edges of a soundtrack. This leads to the important advantage of improved edge detection.

In the Fourier plane the light beam scanning partially over the edge of the soundtrack is resolved into 3 components:
1. Blocked light
2. Edge-diffracted light
3. Transmitted light In one embodiment, the detector area is circular and restricted to the area of the non-obstructed beam. The light-to-dark and/or the dark-to-light transition curve is thus invariant to the orientation of the soundtrack edges, i.e. the frequency and amplitude of the signal. The VEP may in this embodiment be determined as the position where the energy in the centre has reached a certain trigger level (where it triggers a pulse event).

The detector may in another embodiment have a different shape. For example an elliptical or rectangular shape will produce different light-to-dark and/or dark-to-light transition curves for different frequencies and amplitudes, since the edge-diffracted light occurs perpendicular to the edge.

As already mentioned, the detector may comprise a plurality of detector elements. The detector elements may have any suitable shape, such as for example circular, elliptical, square, or rectangular. For example a circular setup with a centre element and a ring element setup can generate an electronic representation of the energy distribution of the light between the centre and the light diffracted away from the centre. The distribution of the centre element output signal and the ring element output signal may define the VEP instead of the level in the centre itself. This has the significance of making the edge detection insensitive to beam amplitude variations.

A matrix of detector elements may resolve the energy distribution coarsely in 2 dimensions. The VEP may thus be set at different points for different edge orientations.

It will be understood that any number of elements and geometrical arrangements are possible. In an extreme an imaging detector array may be used to map and analyze the energy distribution at the detector plane. It is however essential that even in this case no imaging of the soundtrack is taking place. What is being detected is not image coordinates, but time-angle-energy distributions. This type of detector system could be used to recognize characteristic phenomena in older film tracks, which tend to exhibit certain types of noise and distortion, by recognizing the diffraction patterns they generate. That in turn can launch changes in scanner parameters to counteract the distortion in question. Such parameters may be Focus
Speed curve
Trigger settings
Multi channel detector algorithm It is an important advantage of the present invention that by proper signal processing, e.g. by proper adjustment of the above-mentioned channel characteristics, threshold level and/or trigger levels, of the detector signal, the recorded signal is obtained directly from scanning of the optical sound track on the negative film, i.e. without the need for making a contact print of the negative film, simplifying the process and minimizing cost and effort.

BRIEF DESCRIPTION OF THE DRAWINGS

The invention will be described in further detail below with reference to the enclosed drawings, wherein.

DETAILED DESCRIPTION OF THE INVENTION

Figure 1:
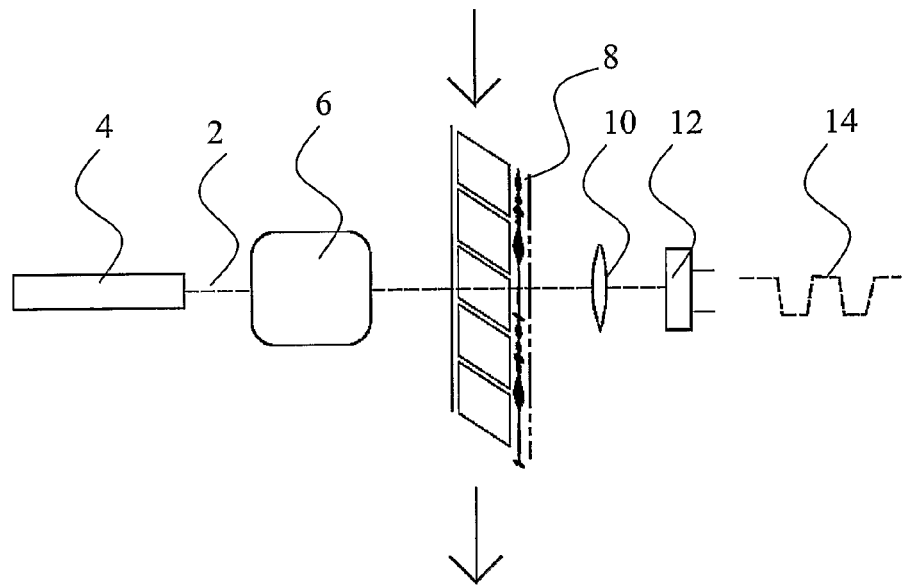
FIG. 1 illustrates the scanning principle of the present invention, FIG. 2 schematically shows one embodiment of the present invention.

The principle of operation of the optical scanner system is schematically illustrated in FIG. 1. A light beam 2 is emitted from a laser 4 and a scanner 6 moves the light beam in a regular pattern across the film sound track 8 in a direction perpendicular to the direction of film movement indicated by the arrow 1. A lens 10 collects the light after transmission through the film onto a detector 12, which generates an electrical signal 14 that goes low when the light beam is blocked and high when the light beam is transmitted through the film. The system produces time-slices of the sound track in the form of a pulse-width modulated signal. The pulse edges are subsequently transformed by an electronic gate and trigger circuit (not shown) into clean pulses, which are subsequently demodulated and filtered into sound. Alternatively, the detector output signal may be digitised for further digital signal processing.

Figure 2:
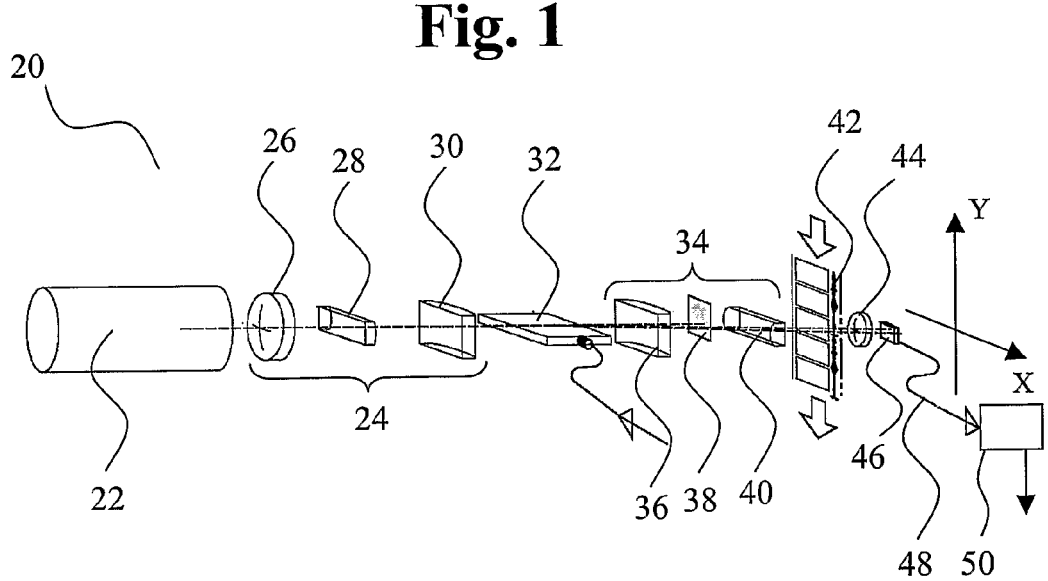

FIG. 2 shows an embodiment of the present invention employing an acousto-optic scanner. The optical scanner system is asymmetric, and the scanner and the optics as a whole enable independent optical axis adjustment. The optical scanner system 20 comprises a laser 22 emitting a light beam that is directed through pre-scan optics 24, which comprises a spherical-curvature singlet or doublet lens 26, a substantially cylindrical lens 28, and a substantially cylindrical lens 30. The pre-scan optics reshapes the laser beam to adapt to the acousto-optic scanner 32. The two lenses 26, 28 diverge the beam in the X-axis or scanning axis to achieve a wide beam near the scanner 32. The two lenses either collimate or focus the Y-axis to a point in or near the scanner crystal, so that the beam height at the scanner is small, typically 0.1-0.5 mm. This is necessary because the acousto-optic crystal has a small active area. The lens 30 near the scanner collimates the X-axis of the beam to a wide diameter, typically several mm.

The scanner thus operates on a beam plane 0.05-0.5 mm, preferably 0.2 mm high and 5-20 mm, preferably 10 mm wide.

The scanner generates a diffracted and scanned beam, e.g. a first order or a second order beam, which passes through post-scan optics 34 comprising a substantially cylindrical lens 36, a zero-order beam block 38, and a substantially cylindrical lens 40. The two lenses 30, 36 define the far focus on the film in the scanning X-axis. The scanner constitutes a positive or negative cylindrical diffractive lens element with a long focal length typically ranging from 1 to 10 m. The lensing depends on the scan direction. Provided that the scanning moves away from the actuator, the lensing is positive. If the scan movement is toward the actuator, the lensing is negative. The lenses 30 and 36 may be simple or complex cylindrical lenses with focal lengths set by the scan area to be covered and the demands on spot profile. The lens 36 typically has a focal length close to the working distance to the target, i.e. 50-500 mm, preferably 150-250 mm. The scanner may have a carrier frequency in the range from 100 to 1000 MHz. The optical scanner 32 emits a flat beam fan, which converges toward optical sound track on the film in the scanning X-axis, while being near collimated in the Y-axis. The flat and scanning beam fan is then focused perpendicular to the scanning plane on the sound track of the film by a lens 40, which is a simple or complex cylinder lens type with a focal range of 10-20 mm typically. The zero-order beam block 38 blocks the zero-order beam from the optical scanner while passing the first-order beam.

The post-scan optics focuses the X and Y-axes of the light beam onto the optical sound track 42 creating the desired spot shape and shapes the light beam on to the optical sound track 42. The light beam scans across the optical sound track in a direction substantially perpendicular to the film movement.

The complexity of the lenses in the pre-scan and post-scan optics depends on the demands on beam quality of the laser and the X-axis scanning spot profile.

In another embodiment an electro-optic scanner may be employed.

The order of the elements 26, 28, and 30 of the pre-scan optics may be changed and/or one or more elements may be left out. The pre-scan optics 24 may comprise one or more further elements.

The order of the elements 36, 38, and 40 of the post-scan optics may be changed and/or one or more elements may be left out. The post-scan optics 34 may comprise one or more further elements.

The light beam passes through a Fourier lens 44 and is detected in the detector 46, which in response to the detected light generates a detector output signal 48. An electronic circuit 50 receives the detector output signal for processing of the detector signal.

The complexity of the system as a whole and of the individual elements depends on the quality requirement of the spot illuminating the film, the quality ($M^2$) of the laser and the F-numbers. By designing with F-number>20 throughout the system and a laser with $M^2$<1.2, a reasonable spot quality can be achieved with simple lens shapes. This results in a rather long, e.g. typically 300-600 mm, optical path. This path may be folded by mirrors or prisms to achieve a practical commercial package.

The optics of the system may comprise one or more diffractive optical elements. It is possible to integrate several diffraction patterns in one diffractive optical element, thereby integrating several optical functions, such as lenses, beam splitters, etc. in one diffractive optical element. This may be utilized to reduce the size of the optical system since the use of bulky classical optical components such as lenses, beam splitters, etc. may be avoided. This also means that use of components sensitive to ambient conditions are avoided, thereby creating a compact and robust optical system.

Figure 3:
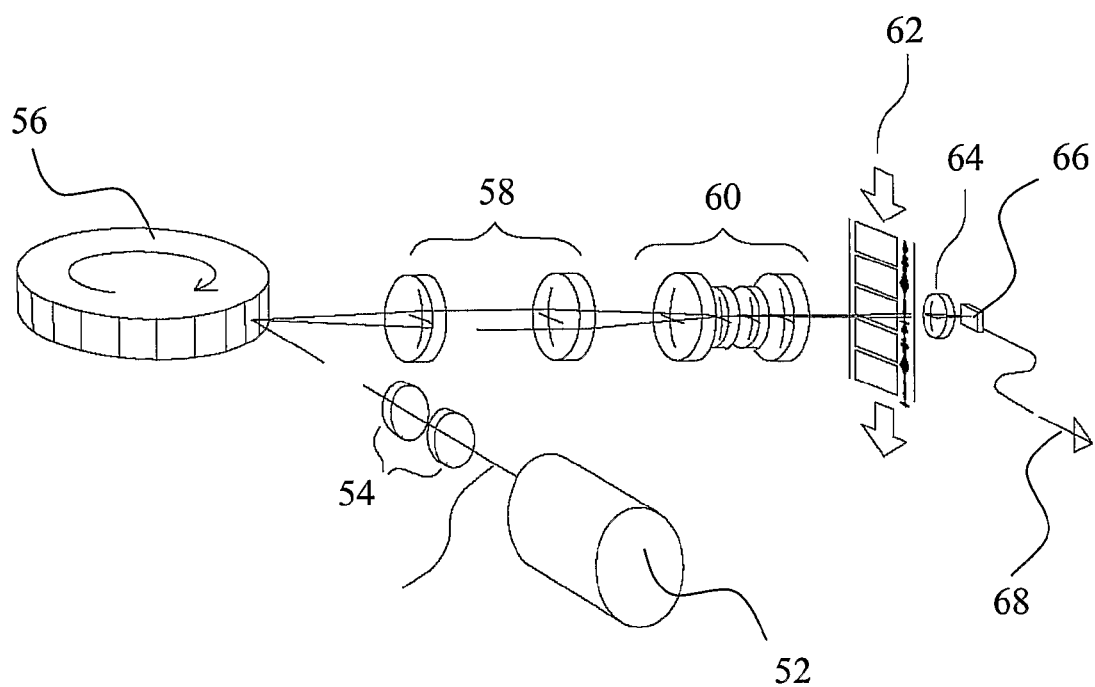
FIG. 3 illustrates a second embodiment of the present invention, FIG. 4 schematically illustrates the operation of an embodiment of a multi-deflection scanner arrangement with a polygon scanner, FIG. 5 schematically illustrates the operation of another embodiment of a multi-deflection scanner arrangement with a polygon scanner, FIG. 6 schematically illustrates the combination of laser scanning and Fourier transform detection.

FIG. 3 illustrates a second embodiment of the present invention. A laser 52 emits a light beam that is directed through pre-scan optics 54 towards a polygon scanner 56. The scan beam from the scanner is directed through relay-lens optics 58 and a suitable objective 60 onto the optical sound track of the film 62.

The polygon scanner 56 has a high number of facets to achieve a high scanning frequency, typically 32-48. The relay lens optics 58 changes the diverging scanning beam from the polygon to a converging beam fan while at the same time diminishing the scan angle and expanding and collimating the beam. This beam fan may then be focused through a conventional objective 60 onto the optical sound track.

Figure 4:
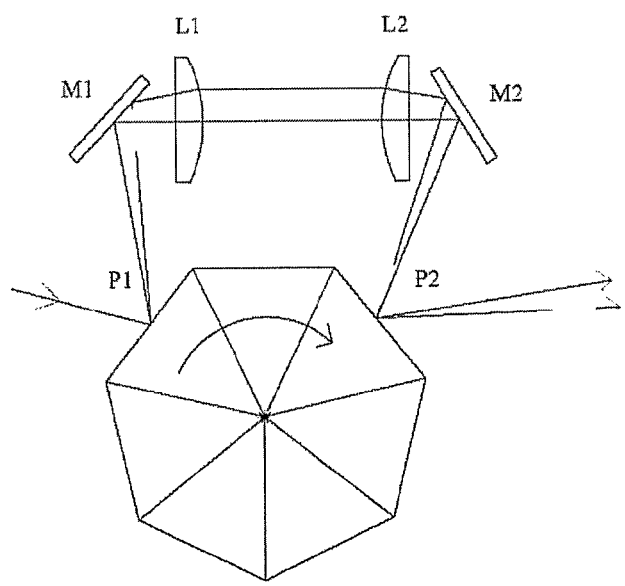
Figure 5:
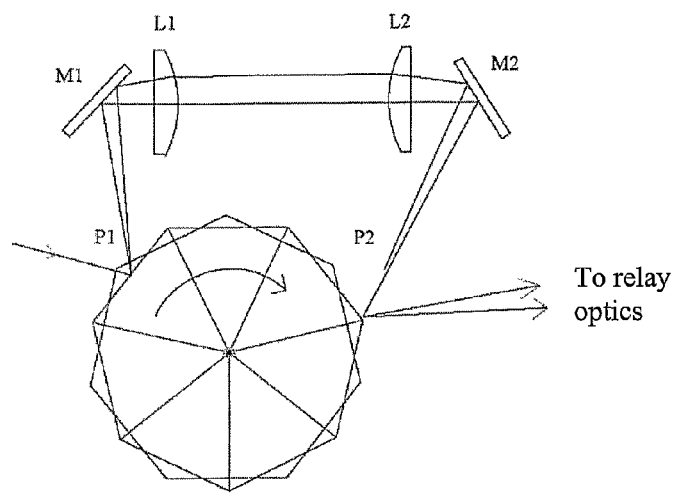

The light beam transmitted through the film passes through a field lens system 64 and onto a photo detector 66. The output signal 68 from the photo detector is passed on to an electrical circuit (not shown). FIGS. 4 and 5 show different embodiments of a multi-reflection polygon scanner wherein the propagation path of the light beam is designed so that the light beam is reflected P1, P2 from two facets. In the embodiment of FIG. 4, the scanned deflection angle of the beam leaving P2 is two times the scanning angle of the beam leaving P1 while the scan frequency is the same for the two beams determined by rotation speed and the number of facets of the polygon scanner.

FIG. 5 shows a different multi-reflection arrangement for multiplication of the scan frequency. The propagation path of the light beam is designed so that the when the beam is incident on the centre of a first facet P1 it is also incident on the edge of a second facet P2 whereby the scanning frequency of the beam leaving P2 is two times the scanning frequency of the beam leaving P1 and the scanning angle of the beam leaving P2 is two times the scanning angle of the beam leaving P1, while the active mirror facet area is effectively halved.

Figure 6:
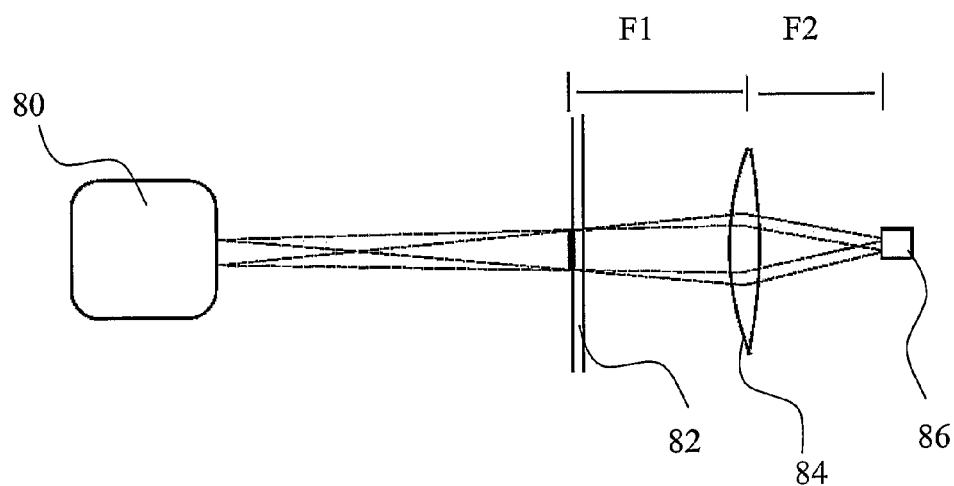

FIG. 6 schematically illustrates the combination of laser scanning and Fourier transform detection. The scanning spot from the scanner 80 is scanned across the sound track 82 and passes through the Fourier optics 84, in the illustrated embodiment a refractive lens, to be received at the detector 86. The Fourier optics is positioned at distance F1 from the soundtrack, F1 being substantially equal to the focal length of the Fourier optics and at distance F2 from the detector, F2 being substantially equal to the focal length of the Fourier optics. Thus, the sound track is positioned at the object plane of the Fourier optics, and the detector is positioned at the Fourier plane of the Fourier optics. The scanning light beam converges onto the sound track plane and diverges after transmission through the sound track, i.e. the beam waist of the light beam resides at the optical sound track. During light beam scanning, the Fourier optics receives the light beam after transmission through the optical sound track and directs it towards the detector for illumination of the entire detector area at every scan angle. This provides for true space-to-time transformation since light from any scanning position illuminates the entire detector area so that detector surface irregularities substantially do not influence the result of the scanning.

Further, the Fourier optics also improves edge detection, since intensity variations at the object plane is transformed into spatial frequencies at the Fourier plane. For example, a uniform intensity at the object plane transforms into an illuminated spot at the centre of the Fourier plane where the detector is situated while an abrupt change in intensity, e.g. caused by an edge of the optical sound track, transforms into high spatial frequencies at the Fourier plane, i.e. light is diverted away from the centre of the Fourier plane and thereby the detector. Thus, the Fourier optics amplifies the effect of the edge so that the electronic output signal from the detector exhibits faster transitions than without the Fourier optics.

Thus, when the spot scans over edges on the sound track, it is gradually obstructed. If the spot and edges were large scale one could simply calculate the dark to light area ratio to get the resulting light intensity at a given point in time. However, in the micrometer scale a significant part of the light is edge diffracted i.e. it is transmitted at different angles. Typically when an edge on the sound track blocks, e.g. 50% of the light, the intensity distribution of the light also changes and the intensity at the centre of the Fourier plane decreases. A small-area detector positioned here improves the edge detection by spatially filtering the edge-diffracted light. This makes it possible to scan with a larger spot size overflowing small scratches, particles and irregularities, which would otherwise block the light beam and generate undesired noise.

Figure 7:
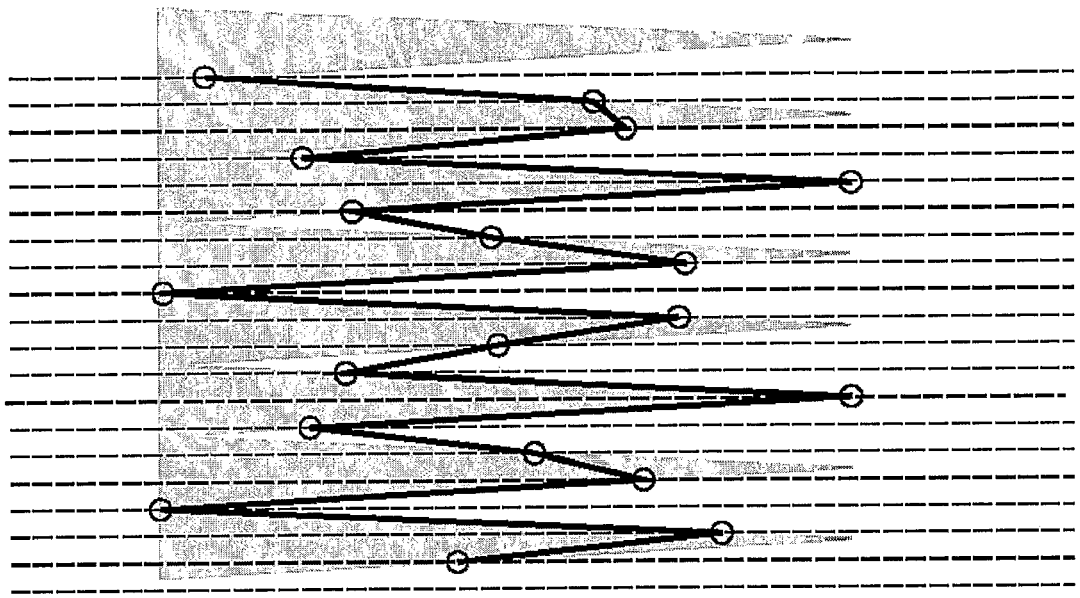
FIG. 7 shows a 32 kHz scan of a 10 kHz tone.

To obtain sufficient over-sampling of the sound track, the scanning frequency must be chosen high enough to obtain a smooth envelope. With sound frequencies in the range from 20-10.000 Hz, typical scanning frequencies known from digital-digital conversion are 32 kHz, 44.1 kHz, 48 kHz, and 96 kHz. In the low end a 32 kHz scan frequency represents 3× over-sampling over a 10 kHz sound wave, which is illustrated in FIG. 7. In this case the detector signal produces only three slopes per wave to describe the waveform. If the scan frequency is a simple multiple of the sound wave frequency, the generated distortion will substantially be a harmonic distortion and misrepresentation of the amplitude. This is the case for, e.g. a 10.667 kHz sound wave being sampled by a 32 kHz scan. However, if the sound wave is 10.617 kHz i.e. 50 Hz off an intermodulation distortion will be generated in the form of a 50 Hz tone.

There is an interrelation between the spot size and the needed over-sampling of the sound track. If the spot is larger than the film displacement per scan so that the samples overlap the envelope of the optical sound track is filtered. A 96 kHz scan is to be preferred since it produces 10 over-samples i.e. 10 points in time to determine the waveform. If the spot is 5 microns or smaller each scan is completely resolved from the next and there may still be some intermodulation though at low amplitude. If the spot is 15 microns 3 scans will partly overlap which means that 3 subsequent points in time will be averaged and the residual intermodulation will be reduced. From the point of view of representing a complex, high frequency waveform the combination of 96 kHz scan frequency and 15 µm spot size is a good choice.

For the subsequent electronic triggering the most important aspect of the pulse edges is that they represent the track in a well-defined manner. The illustrated optical system provides edges, which may subsequently be fine-tuned electronically in an electronic circuit as described later. The scanning spot may be tailored by beam shaping optics in the pre-scan or the post-scan optics to provide the best edge/slope representation.

Figure 8:
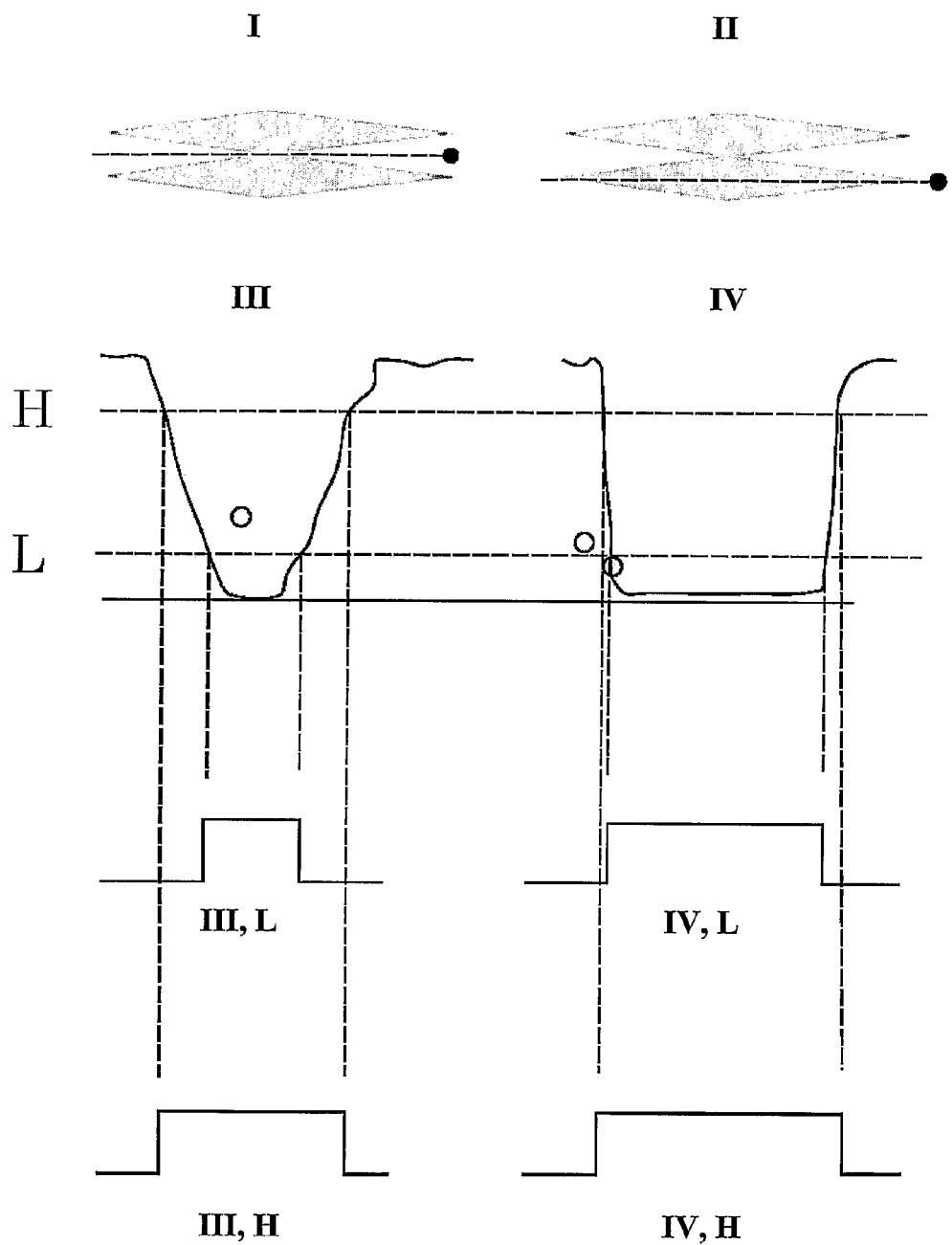
FIG. 8 illustrates image spread compensation by adjustable threshold levels in the comparator circuit.
Figure 9:
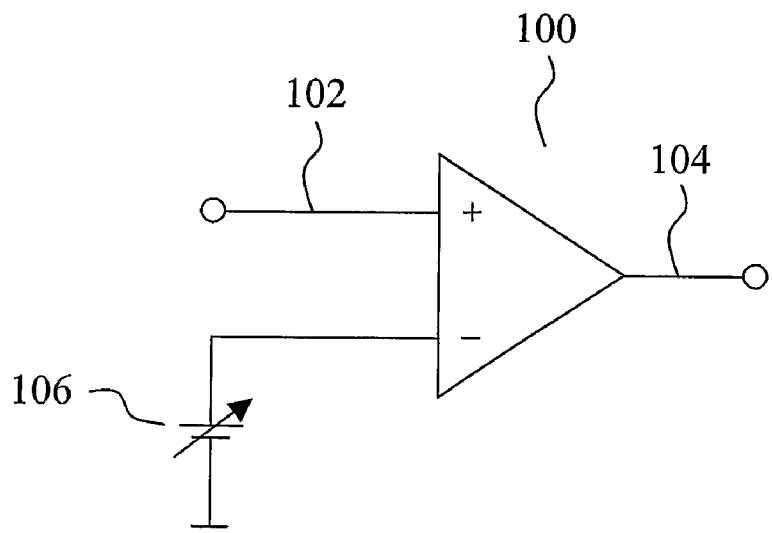
FIG. 9 is a blocked schematic of the comparator circuit of the illustrated embodiment.

Processing of the electronic output signal of the detector is further illustrated in FIGS. 8 and 9. During scanning of the optical sound track, the beam is alternately blocked, transmitted or partially transmitted according to the film type (positive or negative) and sound track type (single or double track, single or double sided). As already explained, upon transmission through the film, the light beam is directed onto the detector 46 by the Fourier optics 44. The output signal 48 from the photo detector is forwarded on to an electrical circuit (not shown) for further processing, e.g. removal/reduction of noise, pulse width modulation and demodulation and digitisation of the PWM signal into sound.

As illustrated by the upper signal wave forms of FIG. 8, the detector 48 generates a signal that is characterized by alternating high and low levels separated by steep rising or falling slopes and with some noise and irregularities caused by film granularity, dust and scratches and irregularities in the sound track itself. The signal may be termed quasi-digital in that the digital high-low characteristic is significant in relation to the irregularities.

The signal III, IV represents a snapshot of width of the sound track I, II at the current film position. By scanning at a high frequency compared to the film displacement, a pulse-width modulated signal is created, the envelope of which represents the sound track. This signal is subsequently transformed by suitable electronic triggering into a pure pulse-width modulated signal III, IV, which may in turn be converted to digital sound or via low-pass filtering to analogue sound.

An important phenomenon of optical sound tracks to take into account, particularly in negatives, is image spread distortion. Image spread is caused by the fact that light during exposure is spread and reflected in the film causing the track edges to expand beyond the intended shape. By correct exposure of the positive from the negative this process may be reversed so that the positive sound track becomes correct. Conventionally, the exposure parameters are tuned using a "double tone" which is usually a combination of a 400 Hz and an 8-10 kHz tone, which are recorded so that the 400 Hz tone is audibly eliminated by correctly reduced image spread.

It is an important advantage of the present invention that electronic compensation of image spread is provided. This is illustrated by the waveforms of the electronic signals of FIG. 8. A preferred embodiment of the present invention comprises an electrical circuit having a comparator circuit 100 as illustrated in FIG. 9, the electrical circuit 100 transforms an output signal 102 from the optical detector 12, 48, 68, 86 into a pulse-width modulated signal 104 suitable for conversion into sound. The comparator circuit has at least one adjustable threshold level 106. As illustrated in FIG. 8, by adjustment of the threshold level to the values H or L, the pulse-width of the pulse-width modulated signal III,L; III,H; IV,L; IV,H can be adjusted. This in turn adjusts the area distribution between dark and light of the optical sound track to compensate for image spread. In the negative the dark area is too large. The above-mentioned double-tone utilized in the conventional compensation of image spread may also be utilized in the adjustment of the threshold level according to the present invention.

The threshold level may be adjusted to a fixed value, or, the threshold level may be adjusted to a selected percentage of the maximum signal value.

Figure 10:
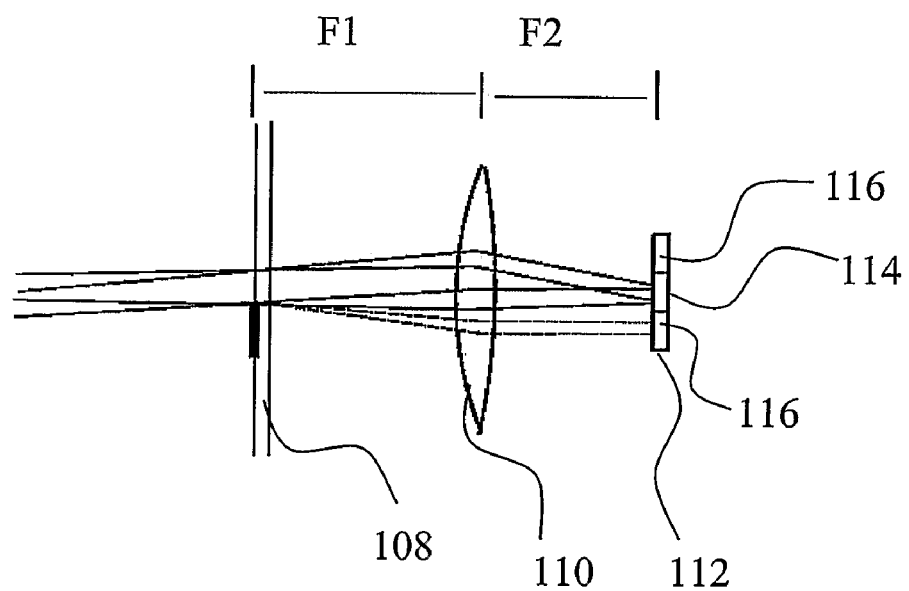
FIG. 10 schematically illustrates the combination of laser scanning and Fourier transform detection to a detector comprising a plurality of detector elements.

FIG. 10 schematically illustrates laser scanning in a cross-section with a detector 112 comprising a circular centre detector element 114 and an annular detector element 116 surrounding the circular centre detector element. The scanning spot from the scanner (not shown) is scanned across the sound track 108 and passes through the Fourier optics 110, in the illustrated embodiment a refractive lens, to be received at the detector 112 having a circular centre detector element 114 and an annular detector element 116. The Fourier optics is positioned at distance F1 from the soundtrack, F1 being substantially equal to the focal length of the Fourier optics, and at distance F2 from the detector, F2 being substantially equal to the focal length of the Fourier optics. Thus, the sound track is positioned at the object plane of the Fourier optics, and the detector is positioned at the Fourier plane of the Fourier optics. The scanning light beam converges onto the sound track plane and diverges after transmission through the sound track, i.e. the beam waist of the light beam resides at the optical sound track. During light beam scanning, the Fourier optics receives the light beam after transmission through the optical sound track and directs it towards the detector for illumination of the detector area at every scan angle. As already mentioned, the light beam or at least a part of the light beam will be diffracted when the beam hits an edge of the soundtrack, and thus different parts of the light beam will hit different segments or parts of the detector, e.g. the circular centre detector element and the annular detector element, during scanning over an edge.

Figure 11:
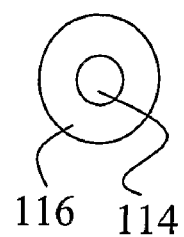
FIG. 11 is a schematic front view of the detector shown in cross-section in FIG. 10, FIG. 12 schematically illustrates the output signals from the respective detector elements in FIG. 10 during a transition from light to dark.

FIG. 11 is a schematic front view of the detector shown in cross-section in FIG. 10.

Figure 12:
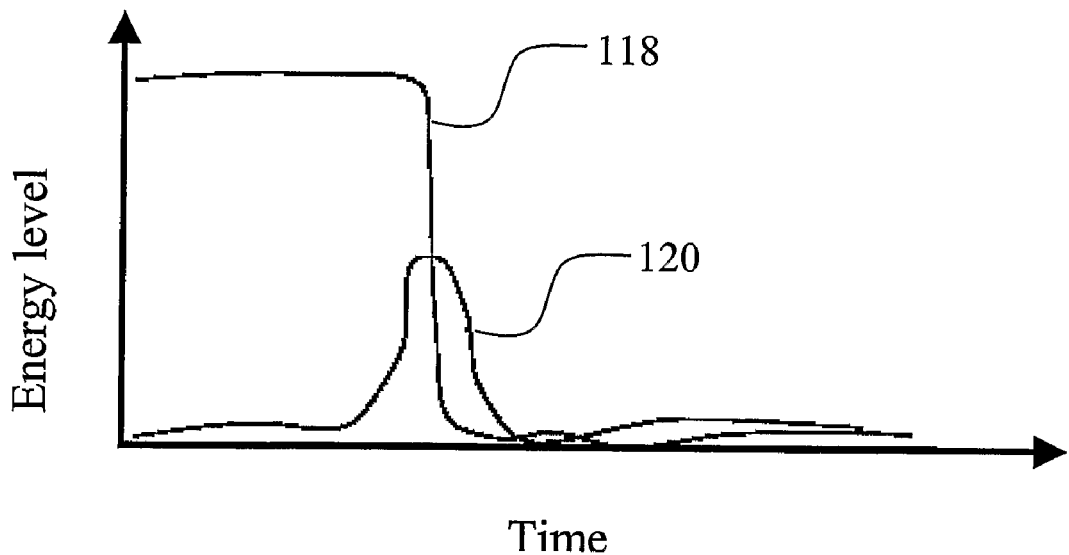

FIG. 12 schematically illustrates the output signals from the respective detector elements in FIG. 10 during a transition from light to dark. The output signal 118 from the circular centre detector element 114 changes rapidly from high to low when the scanning light beam passes over the edge of the soundtrack. The output signal 120 from the annular detector element 116 is low until a part of the scanning light beam is diffracted from the soundtrack edge. The output signal 120 reaches it's maximum when the scanning light beam is diffracted the most and goes towards zero, when diffraction of the light beam is not taking place. Thus the output signal 120 is close to zero when the light beam is not diffracted, i.e. when light beam is blocked or transmitted. A trigger level or signal in the electrical circuit may be set by comparing the two detector element output signals, thereby defining the VEP as when the two output signals are equal.

Figure 13:
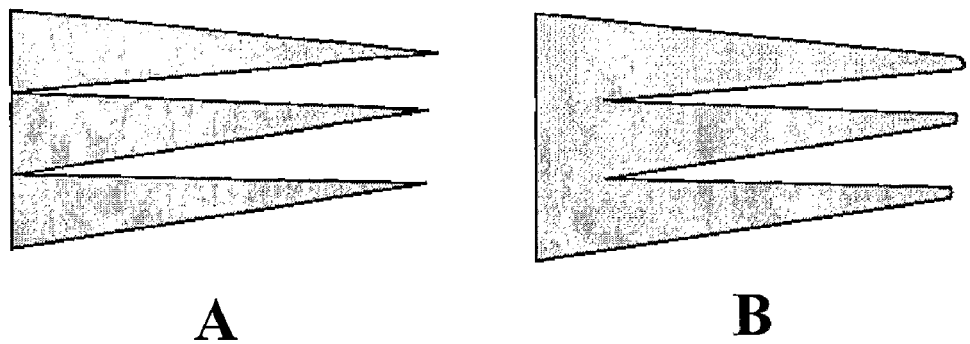
FIG. 13 illustrates the effect of image spread in an optical soundtrack, and FIG. 14 schematically illustrates an electro optic scanner employed in the present invention.

FIG. 13 illustrates the effect of image spread. A shows the intended shape of a part of a soundtrack. B illustrates the effect of image spread on the soundtrack. The peaks are rounded and the valleys are not as deep as intended.

Figure 14:
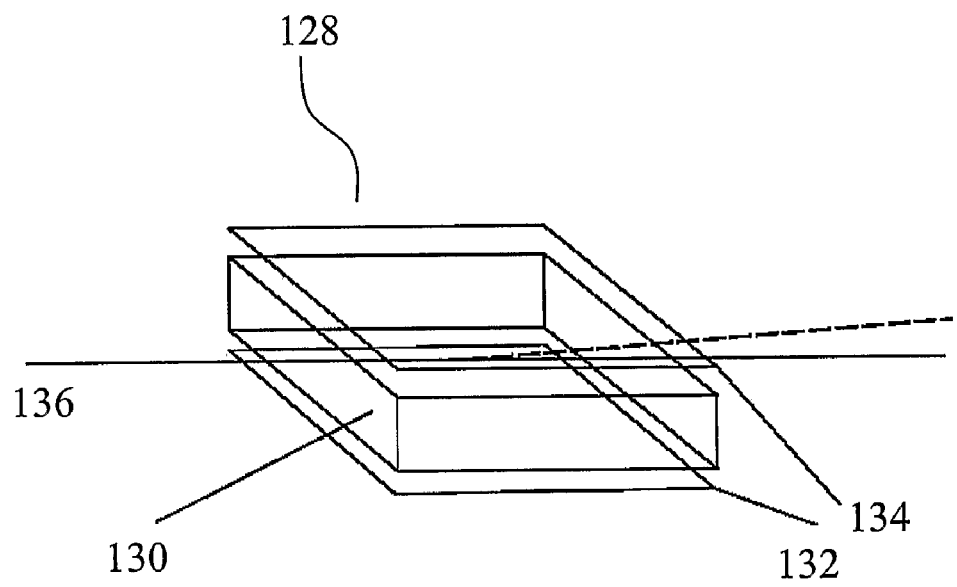

FIG. 14 schematically illustrates an electro optic scanner 128. The refractive index of a crystal 130 changes according to the potential difference between the two electrodes 132, 134. Thus the light beam 136 is deflected in different angles when different voltages are applied to the electrodes 132, 134.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

The invention claimed is:

1. An optical sound track scanner system, comprising:
   a light emitter configured to emit a light beam;
   a scanner configured to scan the light beam across an optical sound track, the light beam forming a scanning spot on the optical sound track;
   an optical detector configured to detect the light beam upon interaction of the light beam with the optical sound track and to generate generating an electronic signal representing the sound recorded in the optical sound track; and
   Fourier optics positioned between the optical sound track and the detector so that the detector resides in the Fourier plane of the optical sound track.

2. A scanner system according to claim 1, wherein the Fourier optics includes a refractive lens with the optical sound track positioned in the front focal plane and the detector positioned in the back focal plane.

3. A scanner system according to claim 1, wherein the Fourier optics includes a diffractive lens with the optical sound track positioned in the front focal plane and the detector positioned in the back focal plane.

4. A scanner system according to claim 1, wherein the optical detector comprises a plurality of detector elements configured to detect the light beam upon interaction of the light beam with the optical sound track and to generate an electronic signal having a plurality of detector element signals, the electronic signal representing the sound recorded in the optical sound track.

5. A scanner system according to claim 1, further comprising pre-scan optics for adaption of the light beam to the scanner.

6. A scanner system according to claim 1, further comprising post-scan optics for control of the light beam forming a scanning spot on the optical sound track.

7. A scanner system according to claim 1, further comprising optical elements for individual focal adjustment of the light beam in its two orthogonal axes.

8. A scanner system according to claim 1, wherein the light beam is substantially perpendicular to the sound track.

9. A scanner system according to claim 1, wherein the light beam is transmitted through the sound track.

10. A scanner system according to claim 1, wherein the light beam is reflected on the sound track.

11. A scanner system according to claim 1, wherein the scanner is a polygon scanner.

12. A scanner system according to claim 11, wherein the polygon scanner is of the multi-reflection type.

13. A scanner system according to claim 1, wherein the scanner includes a transmitting crystal.

14. A scanner system according to claim 13, wherein the scanner includes an acousto-optic scanner.

15. A scanner system according to claim 13, wherein the scanner includes an electro-optic scanner.

16. A scanner system according to claim 13, further comprising means to compensate for lensing.

17. A scanner system according to claim 1, wherein the sound track resides on a negative.

18. A scanner system according to claim 1, wherein the sound track resides on a positive.

19. A scanner system according to claim 1, further comprising an electrical circuit with a comparator circuit, the electrical circuit being adapted to transform an output signal from the optical detector into a pulse-width modulated signal suitable for conversion into sound.

20. A scanner system according to claim 19, wherein the comparator circuit has at least one adjustable threshold level.

21. A scanner system according to claim 1, further comprising an electrical circuit comprising a digital circuit for digital processing of the electronic signal from the detector.

22. A scanner system according to claim 1, wherein the optical scanner operates at a scanning frequency from 20-300 kHz.

23. A scanner system according to claim 1, wherein the light beam forms a scanning spot on the sound track, the scanning spot being of arbitrary shape and having an extension in the range from 4 µm to 35 µm, preferably 15 µm to 25 µm.

* * * * *